United States Patent
Mozes (12)

(10) Patent No.: US 6,691,099 B1
(45) Date of Patent: Feb. 10, 2004

(54) METHOD AND SYSTEM FOR HISTOGRAM DETERMINATION IN A DATABASE

(75) Inventor: Ari W. Mozes, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 103 days.

(21) Appl. No.: 09/872,588

(22) Filed: May 31, 2001

(51) Int. Cl.$^7$ .............................................. G06F 17/30
(52) U.S. Cl. ................................................ 707/2; 707/4
(58) Field of Search .............................. 707/1, 2, 3, 4, 707/5, 6, 7, 8, 9, 10, 101, 102, 104, 104.1

(56) References Cited

U.S. PATENT DOCUMENTS 6,353,826 B1 * 3/2002 Seputis ........................... 707/5
6,529,901 B1 * 3/2003 Chaudhuri et al. ............. 707/3

* cited by examiner

*Primary Examiner*—Diane D. Mizrahi
*Assistant Examiner*—Yicun Wu
(74) *Attorney, Agent, or Firm*—Bingham McCutchen LLP

(57) ABSTRACT

A method and system for determining when to collect, save, and/or utilize histograms is disclosed. A mechanism for automatically deciding when to collect histograms upon request from the user is provided. The histogram collection decision is based on the columns the user is interested in, the role these columns play in the queries as submitted to the system, and the underlying distribution for these columns, e.g., as seen in a random sample. The user specifies which columns are of interest, and the database is configured to collect column usage information that describes how each column is being used in the workload. This column usage information could be stored in memory and periodically flushed to disk. Given a set of potential columns, the distribution of those columns is viewed in combination with the usage information to determine which columns should have histograms.

53 Claims, 6 Drawing Sheets

METHOD AND SYSTEM FOR HISTOGRAM DETERMINATION IN A DATABASE

BACKGROUND AND SUMMARY

The present invention relates to the field of computer systems. More particularly, the invention relates to a method and system for database optimization.

A "query" is a statement or collection of statements that is used to access a database. Specialized query languages, such as the structured query language ("SQL") are often used to interrogate and access a database. Many types of queries include at least the following. First, the identity of the database object(s) being accessed to execute the query (e.g., one or more named database tables). If the query accesses two or more database objects, what is the link between the objects (e.g., a join condition or column). The typical query also defines selection criteria, which is often referred to as a matching condition, filter, or predicate. Lastly, a query may define which fields in the database object are to be displayed or printed in the result.

Optimization is the process of choosing an efficient way to execute a query statement. Many different ways are often available to execute a query, e.g., by varying the order or procedure in which database objects and indexes are accessed to execute the query. The exact execution plan or access path that is employed to execute the query can greatly affect how quickly or efficiently the query statement executes.

Cost-based optimization is an approach in which the execution plan is selected by considering available access paths to determine the lowest cost approach to executing the query. In one approach, cost-based optimization consists of the following steps: (1) generating a set of potential execution plans for the database statement to be executed; (2) estimating the cost for each execution plan; and (3) comparing the costs of the execution plans to identify the execution plan having the lowest cost. Conceptually, the term "cost" relates to the amount of a given resource or set of resources needed to process an execution plan. Examples of such resources include I/O, CPU time, and memory. Various measures may be used to identify the execution plan having the lowest cost. For example, the cost-based approach may be used to identify the execution plan providing either the best throughput or the best response time.

Many database optimizers use statistics to calculate the "selectivity" of predicates and to estimate the cost of performing database operations. Statistics quantify characteristics of database and schema objects, such as the data distribution and storage characteristics of tables, columns, indexes, and partitions. Selectivity refers to the proportion or fraction of a database object corresponding to a query predicate. An optimizer uses the selectivity of a predicate to estimate the cost of a particular access method and to determine optimal join order.

Statistics should be gathered on a regular basis to provide the optimizer with needed information about schema objects. Significant costs may be incurred to collect and maintain statistics for database objects. To reduce this collection cost and improve performance, many database systems use data sampling to reduce the amount of data that must be collected to provide statistics used by the optimizer. With data sampling, only a portion of the rows within a database table is accessed to generate a set of statistics for the entire table or column. The results of the data sampling is thereafter scaled upward to extrapolate the statistics values for the entire population. However, different data distributions may require different sample sizes in order to obtain accurate statistics. If a too-small sample size is selected, then the statistics may be inaccurate, which could lead to sub-optimal execution plans and poor query performance. If a too-large sample size is selected, then resources are wasted to collect more data than is needed to provide accurate statistics. Consequently, it is desirable to use only the minimal sample size needed for accurate statistics collection.

In addition to statistics, optimizers often use data value histograms to select an optimal execution plan. A data value histogram is a structure that provides estimates of the distribution of data values in a database object. A histogram partitions the data object values in a set of individual "buckets", so that all values corresponding to a given range fall within the same histogram bucket. The histogram provides information that is helpful in determining the selectivity of a predicate that appears in a query.

In a height-balanced histogram, each bucket of the histogram corresponds to an equal number of rows in a table. The boundaries of the buckets shrink or grow so that all buckets maintain the same number of entries. The useful information provided by the histogram is the range of values that corresponds to each bucket, e.g., the endpoints for each bucket of the histogram. Consider a column C with values between 1 and 100 in which the column data is uniformly distributed. FIG. 1a shows a height-balanced histogram plotted for this column having ten buckets. The number of rows in each bucket of the histogram is one-tenth the total number of rows in the table. Since the data values are evenly distributed, the endpoints of the buckets are also evenly spaced.

Now consider a second column having 100 rows for which column data values are not evenly spaced, in which ninety rows contain the value "1" and the other ten rows contain a column value between 2 and 100. FIG. 1b shows this column plotted in a height balanced histogram of ten buckets. Since ninety percent of the rows have the value "1", nine of the ten buckets in the histogram of FIG. 1b also correspond to the value "1". Thus, it can be seen that nine of the ten buckets in the histogram of FIG. 1b have endpoints that end in the number "1". The last bucket corresponds to the ten rows in the column having data values between "2" and "100". In operation, such a histogram provides an optimizer with instant knowledge of the selectivity of particular values of a column. This selectivity information can be used, for example, to determine whether either a full table scan or an index access provides the most efficient path to satisfying a query against the database table corresponding to the histogram.

Other types of histograms also exist. For example, another histogram used by optimizers is the width-balanced histogram, in which column data is divided into a number of fixed, equal-width ranges and the histogram is organized to count the number of values falling within each range.

A histogram may not always provide an appreciable benefit. For example, a histogram may not be useful for a data set having uniform data distribution, since it can be assumed that all data within that set are equally distributed and therefore the histogram will not provide any additional useful information. If a histogram is desired, a significant amount of resources may be needed to collect, maintain, and use histograms. Therefore, it makes sense to only create, store, and/or use a histogram when such a histogram provides benefits greater than the expense of the histogram.

However, conventional database systems typically rely upon the skill and knowledge of individual database administrators to manually decide whether histograms should or should not be collected for columns in the database. While guidelines may be provided to assist this decision-making, this manual process by administrators often leads to inconsistent and erroneous decisions resulting in the collection and storage of unneeded histograms, or the failure to collect histograms that could provide more efficient query processing.

The present invention provides a method and system for determining when to collect histograms. In an embodiment, the invention provides a mechanism for automatically deciding when to collect histograms upon request from the user. This decision is based on the columns the user is interested in, the role these columns play in the queries as submitted to the system, and the underlying distribution for these columns, e.g., as seen in a random sample. The user specifies which columns are of interest, and the database is configured to collect column usage information that describes how each column is being used in the workload. This column usage information could be stored in memory and periodically flushed to disk. Given a set of potential columns, the distribution of those columns is viewed in combination with the usage information to determine which columns should have histograms.

The invention also provides a system and method for determining an adequate sample size for statistics collection. In one embodiment, the invention provides a mechanism for automatically determining an adequate sample size for both statistics and histograms. This is accomplished via an iterative approach where the process starts with a small sample, and for each attribute which may need more data, the sample size is increased while restricting the information collected to only those attributes that require the larger sample.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The invention is described with reference to specific embodiments. It will, however, be evident that various modifications and changes may be made thereto without departing from the broader spirit and scope of the invention. The reader is to understand that the specific ordering and combination of process actions shown in the process flow diagrams and system components in component diagrams described herein are merely illustrative, and the invention can be performed using different, additional, or different combinations/ordering of process actions and components. For example, the invention is particularly illustrated herein with reference to specific database objects such as tables, columns, and rows, but it is noted that the inventive principles are equally applicable to other types of database objects. The specification and drawings are, accordingly, to be regarded in an illustrative rather than restrictive sense.

Figure 1A:
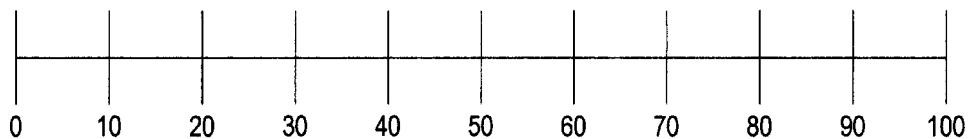
FIGS. 1a and 1b show example histograms.
Figure 1B:
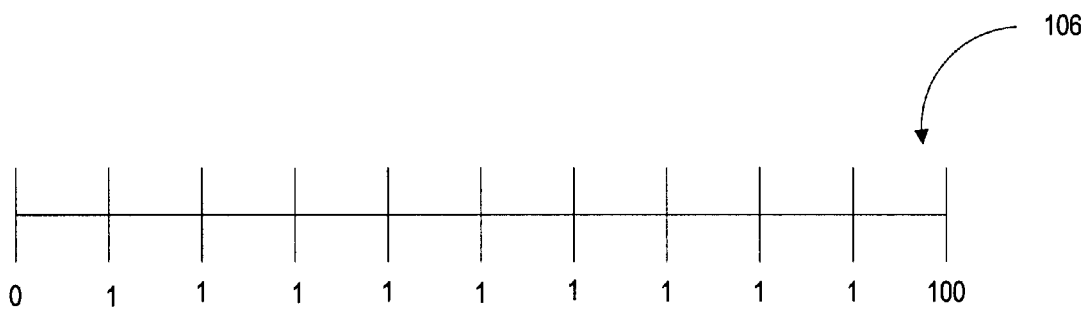
Figure 2:
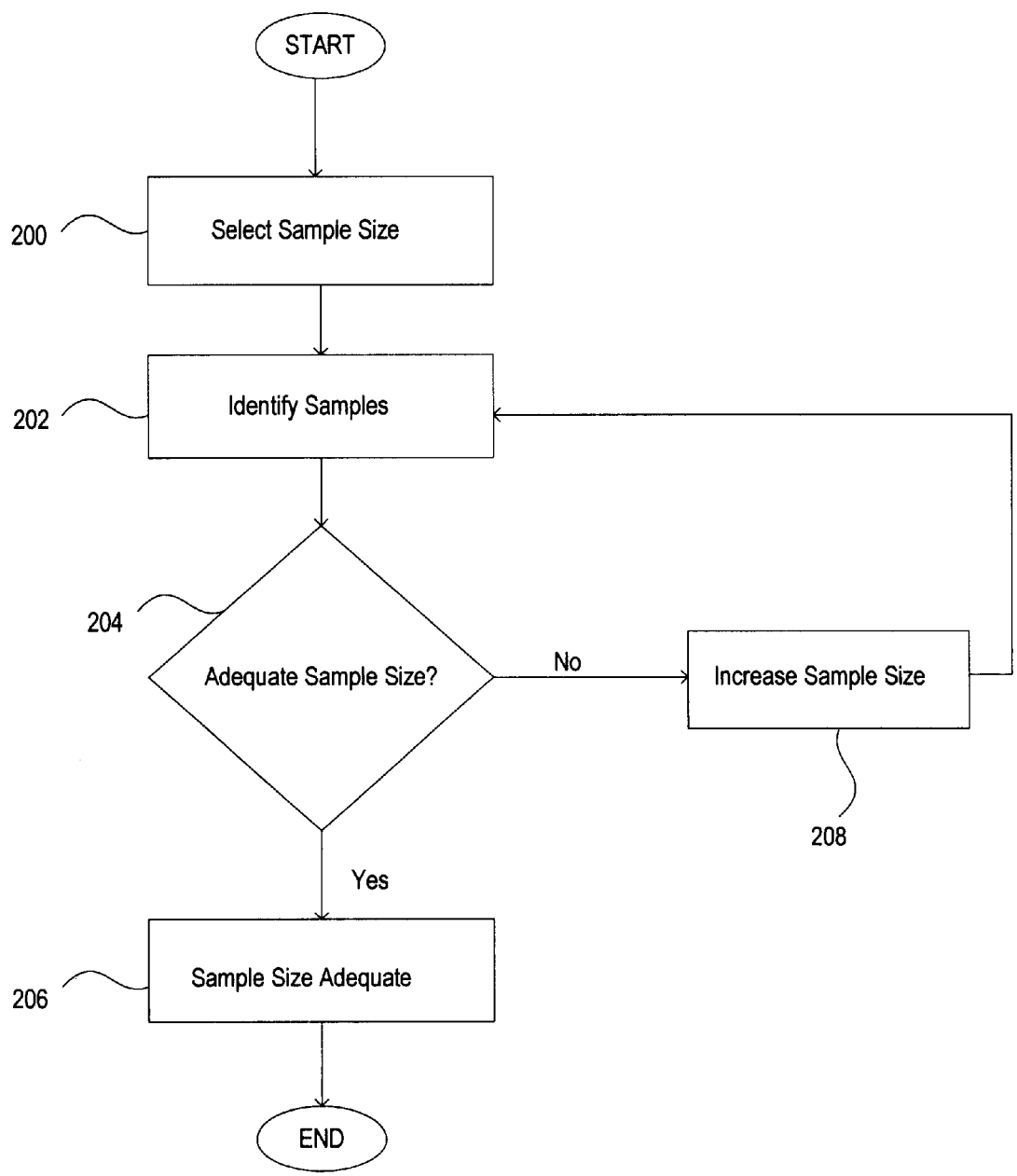
FIG. 2 shows a flowchart of a process for determining sample size for statistics collection according to an embodiment of the invention.

FIG. 2 shows a flowchart of a process for determining sample sizes for statistics collection, according to an embodiment of the invention. At step 200, an initial sample size is selected for statistics collection. In an embodiment, the selected sample size could be expressed as a percentage of the rows in a table. Other measures could be used to express sample size, such as an exact number of rows for the table.

At step 202, rows in the table are identified based upon the initially selected sample size. In an embodiment, this is accomplished by attempting to select the number of rows in the table corresponding to the percentage value used to express the initially selected sample size. For example, consider if the initially selected sample size is 20% and the number of rows in the table is 1000. For this example, the expected number of rows to be identified in step 202 is $(1000)*(0.20)=200$ rows. One way to achieve this is to provide a function (e.g., a "sample( )" function) that chooses rows from the table based upon the selected percentage value, in which each row is individually faced with a given percentage chance of being selected. If the sampling percentage is 20%, then each row in the column individually faces a 20% chance of being selected. In this manner, over the entire table, it is likely that approximately 20% of the rows in the table will be selected. The exact rows to be selected will be subject to a certain amount of randomization, and it is possible that the exact number of rows actually selected will be greater or smaller than 20%. The statistics gathered based upon this sampling can later be used to extrapolate statistics for the entire table.

At step 204, a determination is made regarding whether the number of sample rows identified in step 202 is adequate. In an embodiment, this step is performed by determining whether statistics for the identified rows using the initial sample size can be adequately scaled upward to extrapolate accurate statistics for the entire table. One approach to accomplishing this is to compare the selected number of rows with a minimum value for the particular statistics for which sampling is performed. For example, consider if the statistic being addressed by the sampling is the "Number of Rows in Table." A minimum value, such as "2500" can be established for this type of statistic. If the identified number of rows from step 202 is less than 2500 rows, then the sample size or sample percentage is increased (208), and steps 202 and 204 are repeated until the minimum sample size is achieved. If the number of rows identified in step 202 meets or exceeds the minimum value, then the sample size is adequate (206).

It is noted that different statistics may require differing tests to determine whether rows sampled during step 202 can be adequately scaled upward to provide statistics for the entire table. The following are additional examples of statistics used for database optimizers: 1) average column length; 2) number of distinct values in column; 3) minimum value in column; and 4) maximum value in column. For the average length, minimum, and maximum statistics, the number of rows sampled during step 202 can be compared to another minimum value, e.g., "919", to determine whether the sample size is adequate.

Figure 4:
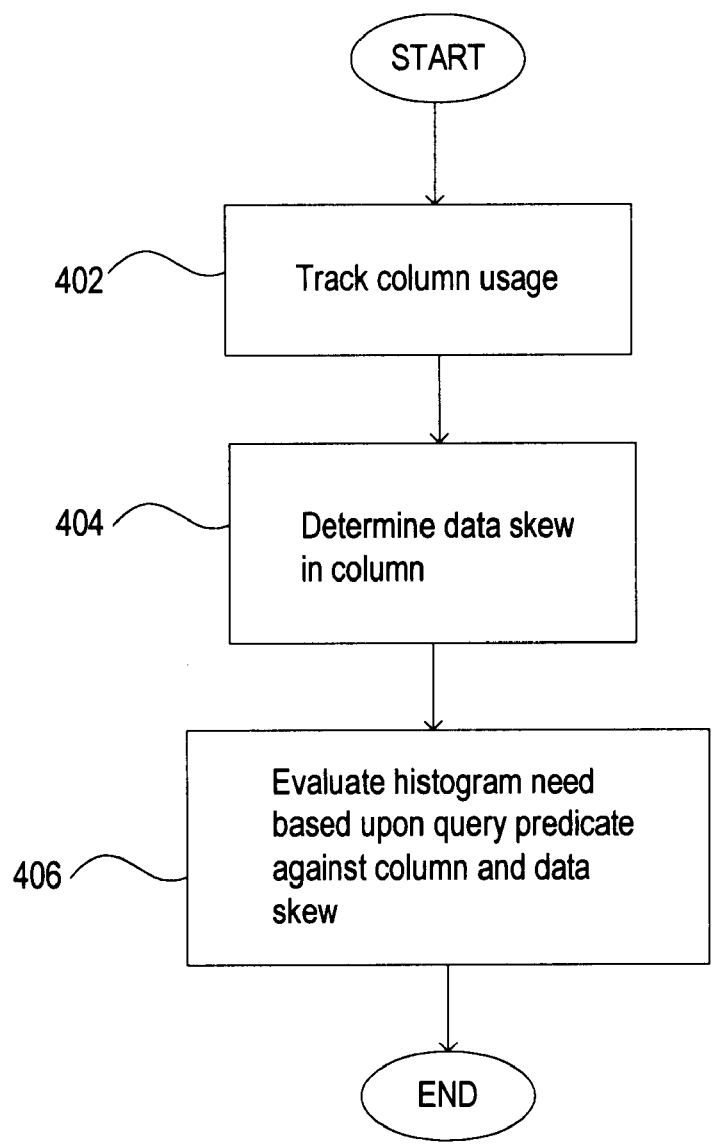
FIG. 4 shows a flowchart of an alternate process for histogram determination according to an embodiment of the invention.

FIG. 4 is a flowchart of a process for determining whether a histogram should be collected or saved according to an embodiment of the invention. At step 402, column usage is tracked during workloads executed against a table. In an embodiment, this is accomplished by marking individual columns while executing queries against those columns. A recordation is made regarding the type of predicate that is evaluated against a column. For example, this type of recordation tracks whether, and how often, an equality, range or like predicate is evaluated against a column. At step 404, a determination is made whether data skew exists for the column values. The predicate type for a particular column and the data skew within that column are analyzed to determine whether a histogram should be collected for the column (406).

In an embodiment, if equality and/or equijoin predicates are evaluated against a column and the column data exhibits non-uniform value repetition, then a histogram should be collected and/or saved for the column. If like or range predicates are evaluated against a column and the column data exhibits non-uniformity in range, then a histogram should be collected and/or saved. The meaning of "non-uniform value repetition" and "non-uniformity in range" is defined below according to one embodiment of the invention.

Figure 3:
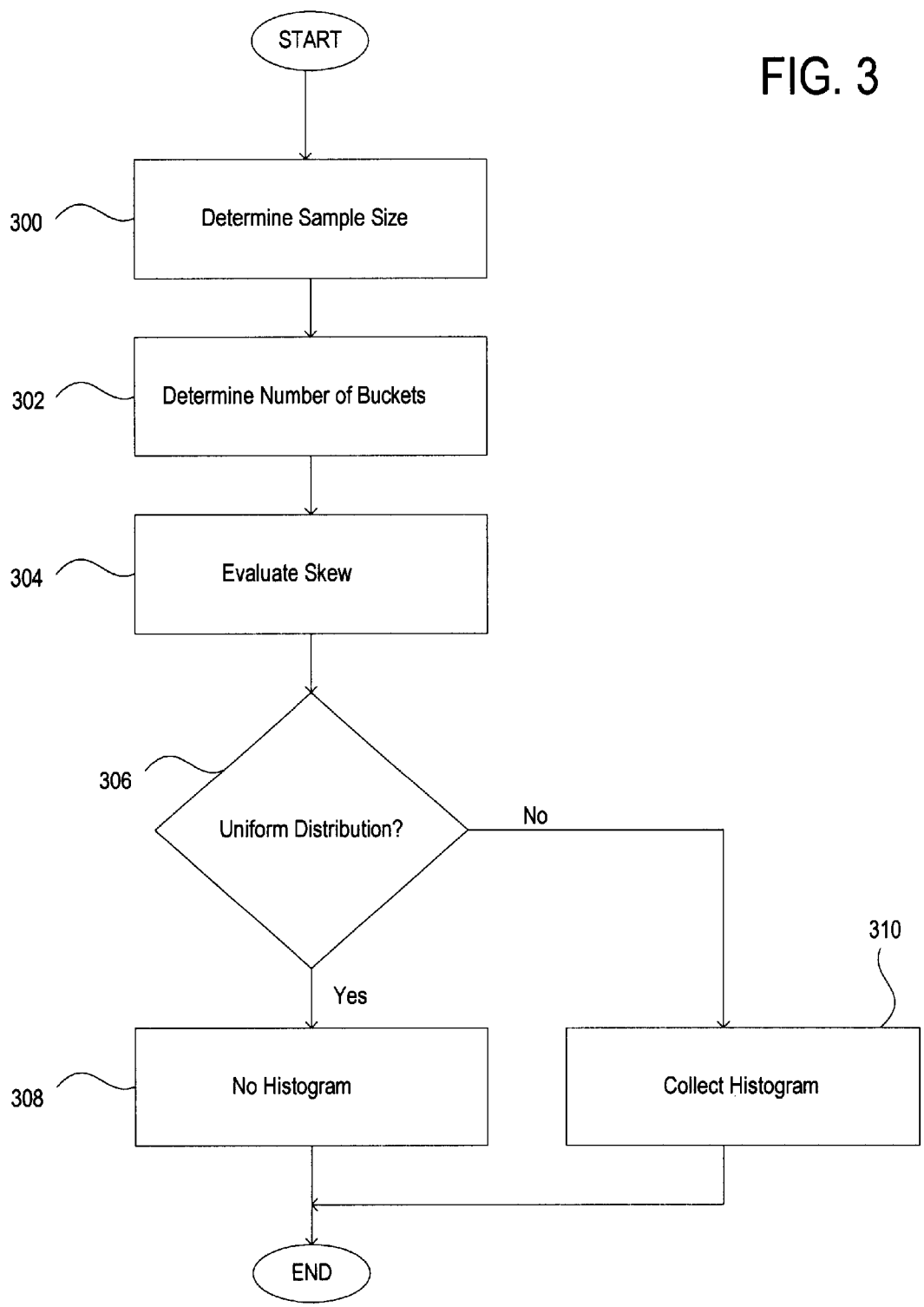
FIG. 3 shows a flowchart of a process for histogram determination according to an embodiment of the invention.

Instead of, or in addition to, the process of FIG. 4, the process shown in FIG. 3 can be used to determine whether a histogram should be collected or saved for a table column. If data sampling is being performed, then a determination is made at step 300 whether the sample size is adequate. If not, then the sampling rate is adjusted upward to collect an adequate sample size. In one embodiment, if the number of non-null column values in the sample is less than 2500, then the sample rate is increased to provide more samples.

At step 302, a determination is made regarding the expected number of buckets for the histogram. At step 304, data uniformity/range skew is evaluated for the data sample values with respect to the expected histogram buckets. In an embodiment, this is accomplished by gathering frequency and histogram information for the column values. For example, a simple query can be executed to collect distinct values and their counts for a column. At step 306, a determination is made whether the column values are uniform. In an embodiment, this determination checks whether any values repeat more than other values in the column, or whether there are any range skews in the data. If so, then the data is non-uniform. If the data is non-uniform, then a histogram is collected for the column (310). If the column data is uniform then the values in the column are considered to be equally distributed; therefore, either no histogram is collected or a previously collected histogram is not saved/used (308).

Illustrative Embodiment

The present section describes pseudocode to implement an illustrative embodiment of the invention. Initially, the illustrative embodiment begins by building an array of columns needing statistics. Then, the illustrative process primes data structure bits that represent which statistics need to be gathered for which columns. The process may re-invoke this procedure when auto-increasing the sample size to re-set the still necessary bits for statistics requiring an increased sample size. The process creates a list of query statements needed to gather all statistics—this "select" list may be reused across all partitions and subpartitions. These queries are executed to gather statistics for every table/partition object requested. Finally, the illustrative procedure sets the gathered statistics in a data dictionary. The sample size used while gathering statistics is automatically adjusted during the procedure to ensure adequate sample size for the particular statistics being collected. The following comprises high-level pseudocode for the illustrative embodiment:

```
if auto sample size
   do a quick row count estimate of the object
   initialize all of the statistics bits for the columns
   while there are still unresolved statistics
      generate the from clause for the query
      execute the basic query
      work on all of the desired histograms
      evaluate the basic statistics
      if some statistics are not ready (need larger sample
           size)
         construct a new select list using the current
              statistics bits
```

The following table defines variables used in the illustrative pseudocode.

TABLE 1

| Term | Definition |
| --- | --- |
| p | Sampling fraction (between 0.0 and 1.0) |
| n | Number of rows in the table |
| avg | Average column length statistic |
| min/max | Minimum/maximum column value statistic |
| nv | Number of null column values statistic |
| ndv | Number of distinct values statistic |
| s | Number of rows seen in the sample |
| snnv | Number of non-null column values seen in the sample |
| sndv | Number of distinct values seen in the sample |
| mnb | Maximum number of buckets allowed in the histogram |

The following is pseudocode for the top level routine for gathering statistics and for determining whether a histogram should be collected:

```
estimate n—use block sample count(*) on user's table
initialize_gather_bits( )
while (some statistics still need to be (re)collected)
   generate_from_clause( )—includes possible material-
       ization of new table
   execute_basic( )
   execute_hist( )
   evaluate_basic( )
```

This top level pseudocode executes the main functions that comprise the statistics gathering processes according to one embodiment of the invention.

The initialize_gather_bits( ) function is a procedure which takes in the array of columns for which statistics need to be collected and sets bits representing which statistics are needed. These bits are later individually cleared after gathering statistics and evaluating their probable accuracy. The function is called initially so that the select list can be generated from it for all objects. It is later called again to reset the bits for each new object (e.g., table/partition/subpartition).

The process takes in the list of columns (including statistics bits) and creates a select list to be used to gather basic statistics (not including histograms). In an embodiment, the process ensures that the select list does not contain more functions than the server can handle at once, e.g., only 256 distinct aggregates. If it cannot fit them all in one statement, the caller is informed of which columns are included.

The generate_from_clause( ) function has the responsibility of generating the FROM clause for the basic query and all the histogram queries. In one embodiment, each histogram uses a separate query, and therefore employs a separate scan of the data. If many scans are required and involve sampling the underlying table, it may be beneficial to materialize the sample once and then pass over that multiple times. If that is the case, this procedure in one embodiment will generate a temporary table and populate it with a sample.

The execute_basic( ) function handles the basic statistics query to parse, execute, and fetch information from the database objects. In an embodiment, the query is generated earlier in the process and the column array provides sufficient information to infer the select list.

The evaluate_basic( ) procedure looks at the fetched basic statistics and tries to scale them up. This procedure clears the bits for all statistics that are acceptably scaled, and suggests a larger sampling percentage if some statistics need to be recollected.

The execute_hist( ) procedure is the driver for collecting and evaluating the histogram statistics. This function looks over all columns that are marked as possibly needing histograms. It then collects a frequency histogram, a height histogram, or both, depending upon the expected number of distinct values and the requested number of buckets.

The following comprises pseudocode for an embodiment of the initialize_gather_bits( ) function, in which the following statistics are collected: nv, ndv, min, max, and avg.

```
for each column the user requested
    mark a bit to indicate need to collect the following
        statistics:
        nv, ndv, min, max, avg
    if there is a need to collect a histogram (see results of
        FIG. 4)
        mark a bit indicating this
```

The following comprises pseudocode for an embodiment of the generate_from_clause( ) function, which establishes the initial sampling fraction p for the statistics gathering process:

```
if first time, set p to 5500/n—try for 5500 rows
    otherwise, p is passed in to this function
if ((p<=0) or (p>=0.15)) set p to 1.0—don't sample
if p<1.0 and there are multiple passes (due to histograms)
    materialize the sample in another table and use that
        table instead
```

In the illustrative embodiment, the process attempts to collect 5500 rows. To accomplish this, it is useful to know in advance the number of rows in the table. Based upon the number of rows, the sampling fraction p is established as shown in the pseudocode. If the number of rows is not known, then estimate this value. Certain thresholds can be established for the sampling fraction, beyond which the sampling fraction is set to 1. Under certain circumstances, it may make sense to create another table to hold the sampled data from the column. For example, if multiple passes are needed, e.g., because histograms are to be collected, then the samples are materialized into a table to prevent repeated accesses to the larger base table.

The execute_basic( ) function builds up one or more queries to retrieve sampled data and calculates the desired statistics (excluding histograms in an embodiment). The one or more queries are then executed to retrieve the results for evaluation, as set forth below. In an embodiment, the one or more queries samples rows from the table based upon the sampling fraction p that was previously established.

The evaluate_basic( ) function determines whether the number of rows sampled according to the sampling fraction p can be adequately scaled upward for the entire table.

The following comprises pseudocode for an embodiment of the evaluate_basic( ) function:

```
if(p<1.0)
    if(s<2500)—too small a sample
        bump up p accordingly
    n=s/p
    for each column
        clear all non-histogram bits that indicate which sta-
            tistics to collect
        if nv bit was set
            nv=n-snnv/p
        if (avg, min, or max bit was set) and (snnv<919)
            bump up p accordingly
            set avg, min, and max bits again for next pass
        if ndv bit was set
            try to scale it up *
            if cannot scale upward
                bump up p accordingly
                set ndv again for next pass
else—this was not an estimate
    set all requested statistics
```

The pseudocode first checks that at least 2500 rows were sampled based upon the current sampling fraction (p). If not, then the sampling fraction is adjusted upward and the table is re-sampled. If a sufficient number of rows has been collected, then the number of rows (n) is estimated based upon the following: n=s/p, where s represents the number of rows that have been collected.

For the average length, minimum, and maximum column value statistics (avg, min, max), the pseudocode checks that at least 919 non-null column values (snnv) are detected in the sample. If so, then these values are considered adequate for the entire table. If not, then the sampling fraction p is increased for the next pass through the table.

For the number of distinct values statistic (ndv), the pseudocode attempts to scale this statistic up for the entire table. If the statistic based upon the sampled rows cannot be scaled upward, then the sampling fraction is increased for the next pass through the table.

The following comprises pseudocode for scaling ndv and density (defined below) statistics according to an embodiment of the invention:

```
sdiv:=sndv/snnv
if ((snnv<100) or
    ((snnv>=100) and (snnv<500) and (sdiv>0.3299)) or
    ((snnv>=500) and (snnv<1000) and (sdiv>0.4977))
        or
    ((snnv>=1000) and (snnv<2000) and (sdiv>0.5817))
        or
    ((snnv>=2000) and (snnv<5000) and (sdiv>0.6634))
        or
    ((snnv>=5000) and (snnv<10000) and
        (sdiv>0.7584)) or
    ((snnv>=10000) and (snnv<1000000) and
        (sdiv>0.8169)) or
    ((snnv>=1000000) and (sdiv>0.9784)))
    cannot reliable use kkesdv to scale the value else
    can use kkesdv scaling reliably
nnv:=snnv/p
if ((sndv=snnv) and
    ((snnv>=29472) or
        ((nnv<10000) and (snnv>=708)) or
        ((nnv<40000) and (snnv>=1813)) or
```

((nnv<160000) and (snnv>=4596)) or
((nnv<640000) and (snnv>=11664)))) then
  can use linear scaling reliably—ndv:=sndv*1/p else
  cannot reliably use linear scaling to scale the value The following comprises pseudocode for an embodiment of the kkesdr scaling function:

x1:=sndv
x2:=nnv
stay_loop:=true
while (stay_loop and (x1<=x2)
  x:=floor((x2+x1)/2)
  y2:=x*(1−power(1−(1/x), snnv))
  if (sndv<y2)
    x2:=x−1
  elseif (sndv>y2)
    x1:=x+1
  else
    stay_loop:=false
ndv:=x The execute_hist( ) function determines whether a histogram should be collected. The following comprises pseudocode for an embodiment of the execute_hist( ) function:

for each column with the histogram bit set
  if ((p<1.0) and (snnv<2500))
    not enough data—bump up p for next pass accordingly
  else
    if # buckets specified via an integer or repeat
      set mnb to that value
    else
      set mnb to min(75,(max(200, snnv/26)))
    estimate the ndv based on prior information if available
    if (estimated ndv<(mnb*0.75))—probably a frequency histogram
      execute_frequency( )
    if still need to collect histogram
      execute_height( )

As before, the pseudocode checks whether 2500 rows have been collected during the sampling process. If not, then the sampling fraction (p) is increased for the next pass through the table. The maximum number of buckets (mnb) is set as shown in the pseudocode. The number of distinct values (ndv) is estimated, possibly based upon a previous pass through the table and the prior execution of the evaluate_basic( ) function.

If it is desired to collect a histogram and the estimated ndv value is below a given threshold (mnb*0.75), then a frequency histogram is generated in an embodiment. A frequency histogram is often appropriate for a column having a small number of distinct values. In a frequency histogram, the endpoints of multiple buckets have the same endpoint value (because the same value entry is in multiple buckets). For this reason, buckets having the same endpoint values often do not need an explicitly expressed endpoint. This provides one or more "bucket gaps" in the histogram that allows comparatively cheap storage and compressed representation of such frequency histograms. If this type of data distribution is identified, then the process preferably creates a frequency histogram using the execute_frequency( ) function. If it is desired to collect a histogram and the ndv value is greater than an established threshold, then the procedure generates a height-balanced histogram using the execute_height( ) function in an embodiment of the invention.

The following comprises pseudocode for an embodiment of the execute_frequency( ) function:

build up frequency query and execute it
if (ndv<=mnb)—have a good frequency histogram
  clear histogram collection bit The following pseudocode can be used to build up a frequency query according to an embodiment of the invention:

select c, count(*)
from t sample (s)
where c is not null
group by c
order by c;

This query collects column values from a table and performs a count of the values.

The following comprises pseudocode for an embodiment of the execute_height( ) function:

build up a height-balanced query and execute it
check for non-uniformity
if non-uniformity exists
  try to scale the multiplicative inverse of the density
  if it can be successfully scaled—histogram is ready
    clear histogram collection bit
else
  clear histogram collection bit—no histogram needed In this pseudocode, the column values are checked for non-uniformity. If the column values are uniform, then no histogram is collected. Otherwise, the pseudocode attempts to scale the multiplicative inverse of the density using the previously described process for scaling ndv. In prior evaluations, the number of repetitions was considered uniform over the values; but once histograms are introduced, the popular values can be removed to remove influence upon non-popular values in the histogram.

According to an embodiment, a popular value is a value that corresponds to more than one endpoint in a height-balanced histogram. All values that are not popular are considered non-popular. Density is the expected number of repeated occurrences of a non-popular value. In one embodiment, density can be calculated as the sum of the square of the repetition counts for non-popular values divided by the product of the number of rows in the table and the number of non-popular values in the table.

The following comprises pseudocode for building up a height-balanced query according to one embodiment of the invention:

select maxbkt, min(value) minval, max(value) maxval,
    sum(rep) sumrep, sum(repsq) sumrepsq, max(rep) maxrep, count(*) bktndv
from (
select value, max(bkt) maxbkt,
    count(value) rep, count(value)*count(value) repsq
  from (
    select c as value, ntile(mnb) over (order by c) bkt
    from t sample(s)
    where c is not null
  )
  group by value;
)
group by maxbkt
order by maxbkt;

Here, the inner select statement calls an ntile( ) function, which creates a height-balanced histogram and places data sample values into appropriate buckets in the histogram. In an embodiment, such a function creates an uncompressed histogram and returns a number representing the bucket that a value falls into. The repetition counts (and square of repetition counts) are selected in the middle statement. The outer loop performs a count and checks the values and buckets for the result set. The max and min values for the buckets are reviewed to obtain the histogram endpoints.

Density, which is related to the selectivity of non-popular values in the data sample, is calculated in this procedure using the function results from the outer loop. This is computed in an embodiment by looking at the number of repetitions of a non-popular value.

The result of this query is that one row is obtained per bucket, with missing buckets coming from the more popular values. Each row will have the minimum and maximum value for that bucket, along with the number of rows in that bucket, the sum of the repetition counts and square of the repetition counts for rows in that bucket, and the number of repetitions for the most popular value in that bucket. All missing buckets have been folded into the nearest bucket that is larger.

For example, consider if the process ends up with the following:

| maxbkt | minval | maxval | sumrep | sumrepsq | maxrep |
|--------|--------|--------|--------|----------|--------|
| 1      | 1      | 2      | 2      | 2        | 1      |
| 4      | 3      | 4      | 9      | 65       | 8      |
| 5      | 5      | 5      | 3      | 9        | 3      |
| 6      | 6      | 8      | 4      | 6        | 2      |
| 8      | 9      | 10     | 6      | 20       | 4      |

This would mean that the number 3 is popular because it is the largest value in the missing buckets 2 and 3. Notice that the number 9 is not a popular value because it is only the largest value of a single bucket, bucket 7, and thus would only appear once as a histogram endpoint. To calculate density, the influence of the popular value, 3, would be removed. Since the value 3 appears 8 times, the number 8 is subtracted from the sumrep sum and 64 (square of 8) from the sumrepsq sum. This enables the computation at a density which is based upon the number of rows in the table, the number of non-popular values in the column, and the sum of the square of the repetition counts of non-popular values.

The following pseudocode provides an illustrative embodiment of the invention for histogram determination that was generally described with respect to FIG. 4.

for each column, c, for which a histogram is considered
        if the user has specified size
            create and save a histogram with number of buckets=
                requested size
        else if the user has specified size repeat
            if c already has a histogram with b buckets
                create and save a histogram with b buckets
        else if the user has specified size skewonly
            create a histogram
            if the created histogram exhibits equality or range
                skew
                save it in the dictionary
        else if the user has specified size auto
            check the dictionary for column usage information
            if c has been in a predicate involving an equality, range,
                or like
                create a histogram
                if c appeared in an equality (including equijoin)
                    predicate
                    if the histogram exhibits non-uniformity in value
                        repetition
                        save it in the dictionary
                if c appeared in a like or range predicate (not involving
                    join)
                    if the histogram exhibits non-uniformity in range
                        save it in the dictionary
            any prior histogram on c will be removed The first portion of the pseudocode relates to specific instructions from a user to create a histogram, which results in the creation of the desired histogram. The specific histogram is created without a determination as to whether it is actually needed. Alternatively, the invention can be adapted to automatically check whether a histogram specifically called for by a user should actually be collected and/or saved.

The second portion of the pseudocode relates to automated determination of histogram collection. In this illustrative embodiment, the following items of information are utilized for histogram determination: 1) the subset of columns for which the user wants to gather statistics; 2) the columns which already have histograms created for them; 3) column usage information; and 4) the distribution of data, e.g., as seen in a data sample. Because data distribution information is involved, this process may be advantageously used in conjunction with the process of FIG. 2 for automated sample size determination.

In the illustrative embodiment, column usage information is considered in conjunction with data distribution information for that column to determine whether a histogram should be collected and stored. Column usage information includes, for example, the type of predicates that is executed against the column. The data skew of the column is evaluated against the type of predicate for that column to determine whether a histogram is needed.

When parsing a cursor for the first time in an embodiment, the cost-based optimizer looks at the statistics on all of the objects (tables, columns, etc.) involved in the statement. For each column in the where clause, it will estimate the selectivity of the predicate involving that column. At this point, the system will make an entry in the data structure for the column indicating what type of predicate it was involved in.

In an embodiment, column usage information is collected every time a user hard-parses a statement, in which a bit is marked in memory for the column usage information. Whenever information is flushed to disk, these bits indicate whether to increment the appropriate dictionary columns. For example, if a query containing a column with a range predicate was hard parsed since the last flush, the system will increment the range_predicate counter for that column when the next flush procedure takes place, as well as updating the timestamp. One reason for using counters on disk is to provide a better feel for the importance of the predicate. Counters can also be used in memory, but may result in expensive overhead.

In the illustrative pseudocode, a histogram is created if the column is involved in equality, range, or like predicates. In an embodiment, the histogram is created based on a sampled portion of the column, and is preferably created using a small sample of the entire population that is sufficient to both determine the need for histograms and produce histograms which are representative of the entire population. The number of buckets in the histogram could be based on the sample size. The range max and min is selected based upon the data samples. Values in the data samples are placed into the selected buckets. The process then counts the number of equi-height endpoints that fall within the equi-width buckets. The buckets are reviewed to determine if any buckets are overly large or small. If so, then it is likely that the column does not have uniform data distribution, thereby indicating range skew. In addition, the act of creating a histogram also provides an estimate for the number of distinct values, providing an extra benefit even if the histogram is later discarded.

If an equality or equijoin predicate is involved, then the histogram is saved only if the histogram exhibits non-uniformity in value repetition. For purposes of this example, a column will be considered to have non-uniform value repetition if any value is popular, e.g., repeats as an endpoint in the histogram.

If a like or range predicate is involved, then the histogram is saved only if the histogram exhibits non-uniformity in range. In one embodiment, a column is considered to have non-uniformity in range if it passes the following test:

given that the created histogram had b equi-height buckets
divide the range (max−min) into b equi-width buckets
sum=0
  for each equiwidth bucket
    count the number of equi-height endpoints that fall in the bucket
    sum+=(count*count)
  if (sum/b)>1.7
    this column is considered to be non-uniform in range For a uniform column, the equi-height endpoints would coincide with the equi-width endpoints, and the sum would simply be b.

SYSTEM ARCHITECTURE OVERVIEW

Figure 5:
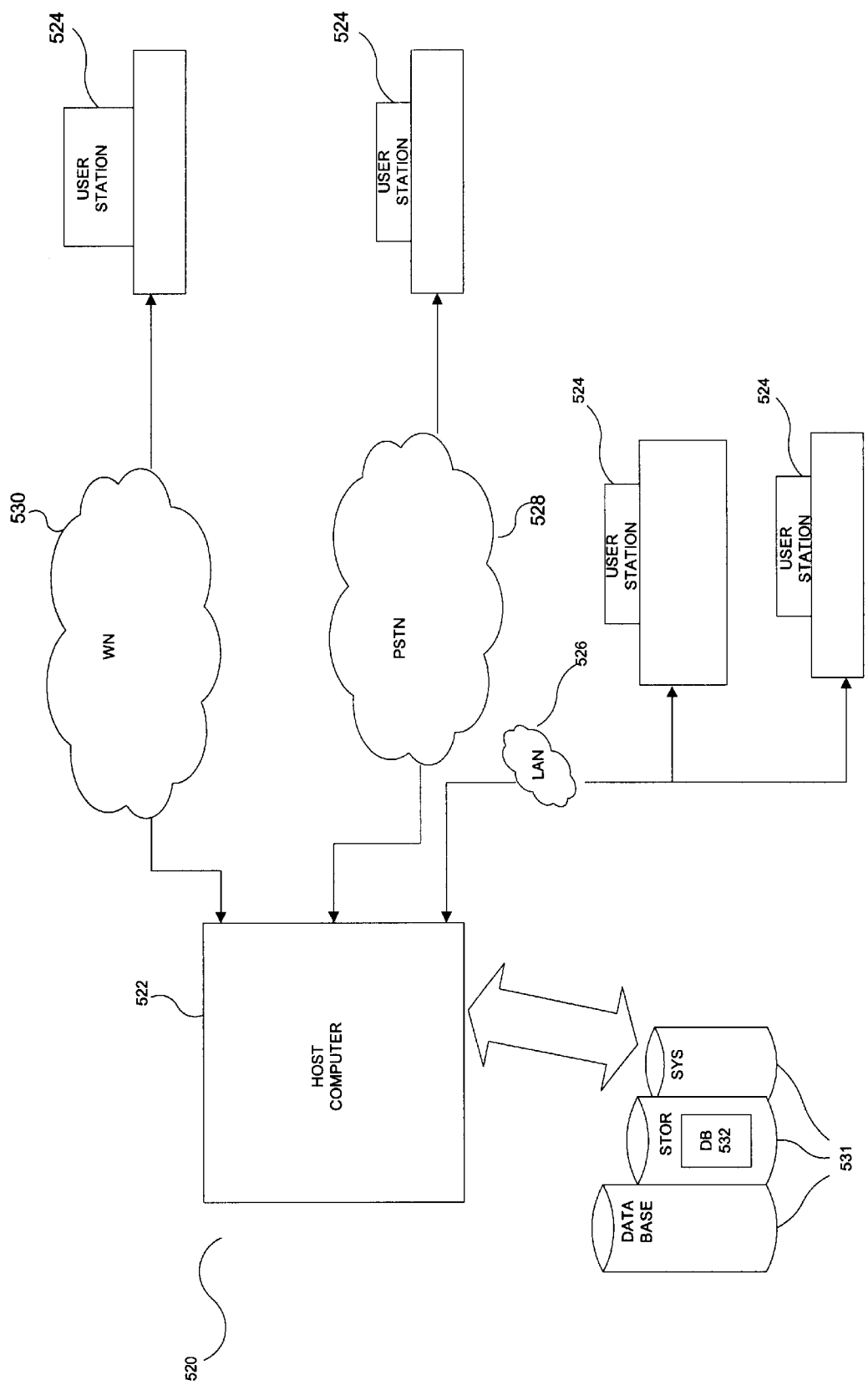
FIGS. 5 and 6 are diagrams of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 6:
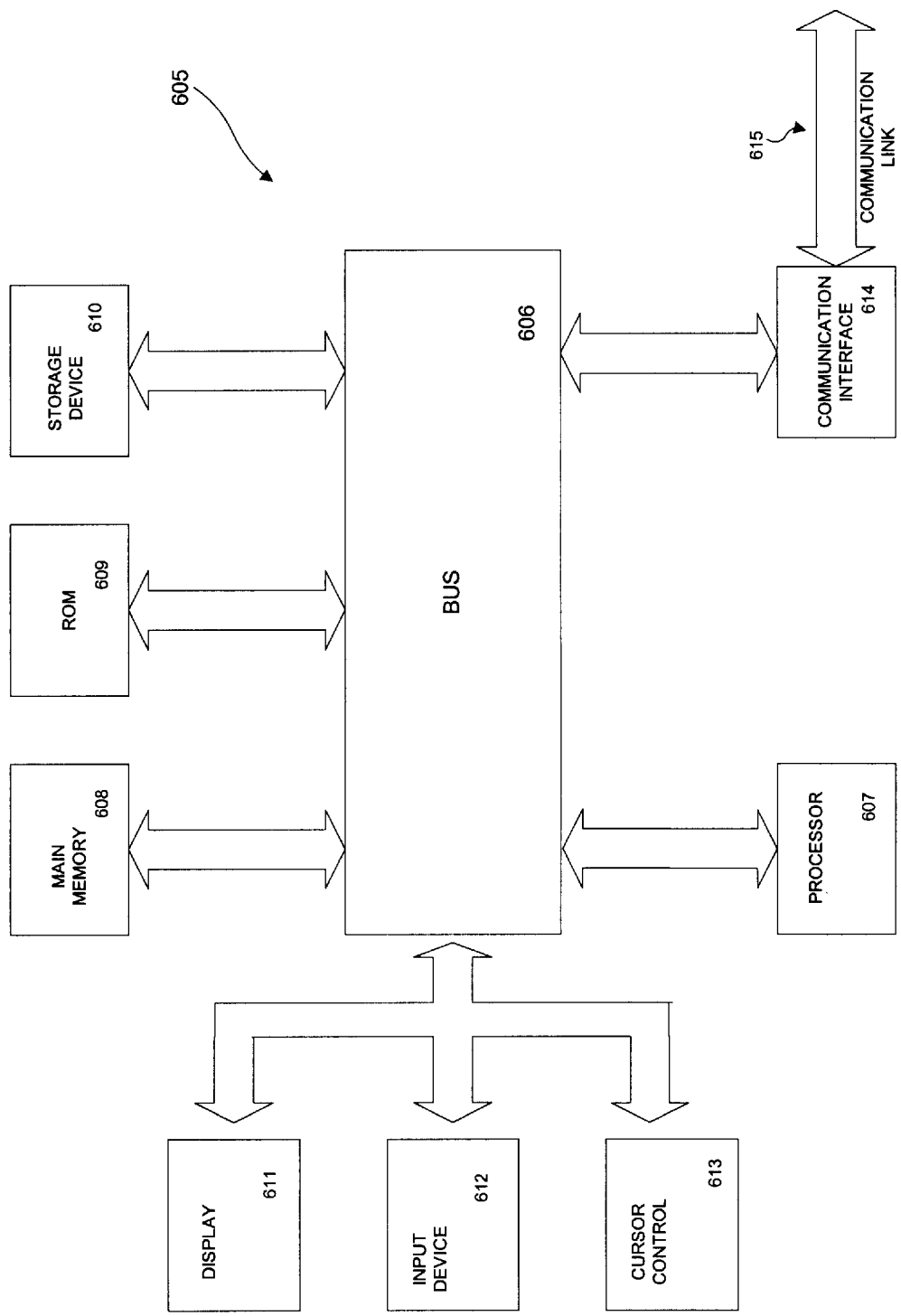

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 624 and the host computer 622. The communication interface 614 of a respective processing unit transmits and receives electrical, electromagnetic or optical signals that include data streams representing various types of information, including instructions, messages and data. A communication link 615 links a respective user station 624 and a host computer 622. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

What is claimed is:

1. A method for histogram determination in a database, the method comprising:
   tracking usage of a database column;
   determining if a selected predicate is asserted against the database column;
   determining if the database column exhibits non-uniformity by analyzing data distribution in the database column;
   identifying the database column as appropriate for a histogram when the selected predicate is asserted against the database column and the database column exhibits non-uniformity; and
   identifying the database column as inappropriate for a histogram when the selected predicate is asserted against the database column and the database column exhibits uniformity, wherein no histogram is collected or saved if a histogram is deemed inappropriate for the database column.

2. The method of claim 1 in which tracking usage of a database column comprises tracking predicate types for queries against the database column.

3. The method of claim 2 in which a counter is maintained to track the usage.

4. The method of claim 3 in which the counter is flushed to disk for persistent storage.

5. The method of claim 1 in which the selected predicate is selected from the group consisting of equality predicate, range predicate, like predicate, and equijoin predicate.

6. The method of claim 1 further comprising generating a histogram when the selected predicate is asserted against the database column and the database column is identified as appropriate for a histogram.

7. The method of claim 1 in which data sampling is performed.

8. The method of claim 7 in which bucket quantity is based upon the data sampling.

9. The method of claim 7 in which sample size is at least 2500 rows or more.

10. The method of claim 1 in which non-uniformity is determined based upon distribution of data values in identified bucket ranges.

11. The method of claim 10 in which range skew is identified based upon determining whether any buckets are larger or smaller than other buckets.

12. The method of claim 1 in which the histogram is deemed appropriate when the selected predicate comprises an equality predicate and the non-uniformity comprises non-uniformity in value repetition.

13. The method of claim 12 in which non-uniformity in value repetition exists when any value repeats as an endpoint in the histogram.

14. The method of claim 1 in which the histogram is deemed appropriate when the selected predicate comprises a like or range predicate and the non-uniformity comprises non-uniformity in range.

15. A method for histogram determination in a database, the method comprising:
   receiving a request to determine a histogram for a database column;
   automatically determining whether a histogram is appropriate or inappropriate for the database column based upon whether the database column exhibits non-uniformity or uniformity, wherein no histogram is collected or saved if a histogram is deemed inappropriate for the database column; and
   collecting and saving the histogram if a histogram is deemed appropriate for the database column.

16. The method of claim 15 in which automatically determining whether the histogram is appropriate or inappropriate comprises determining whether the database column comprises range skew.

17. The method of claim 15 in which automatically determining whether the histogram is appropriate or inappropriate comprises determining whether an identified predicate has been asserted against the database column.

18. The method of claim 17 in which the identified predicate is selected from the group consisting of equality predicate, range predicate, like predicate, and equijoin predicate.

19. The method of claim 15 further comprising tracking predicate types for queries against the database column.

20. The method of claim 15 in which data sampling is performed to automatically determine whether the histogram is appropriate or inappropriate.

21. The method of claim 20 in which a sample size for data sampling is at least 2500 rows of data or more.

22. The method of claim 15 in which the histogram is deemed appropriate when an identified predicate against the database column comprises an equality predicate, the database column is non-uniform, and the non-uniformity in the database column comprises non-uniformity in value repetition.

23. The method of claim 15 in which the histogram is deemed appropriate when an identified predicate against the database column comprises a like or range predicate, the database column is non-uniform, and the non-uniformity in the database column comprises non-uniformity in range.

24. A computer program product that includes a computer-usable medium comprising a sequence of instructions which, when executed by a processor, causes said processor to execute: a process for histogram determination in a database, the process comprising:

tracking usage of a database column;

determining if a selected predicate is asserted against the database column;

determining if the database column exhibits non-uniformity by analyzing data distribution in the database column;

identifying the database column as appropriate for a histogram when the selected predicate is asserted against the database column and the database column exhibits non-uniformity; and identifying the database column as inappropriate for a histogram when the selected predicate is asserted against the database column and the database column exhibits uniformity, wherein no histogram is collected or saved if a histogram is deemed inappropriate for the database column.

25. The computer program product of claim 24 wherein tracking usage of a database column comprises tracking predicate types for queries against the database column.

26. The computer program product of claim 24 wherein the process further comprises generating a histogram when the selected predicate is asserted against the database column and the database column is identified as appropriate for a histogram.

27. The computer program product of claim 24 wherein the process further comprises performing data sampling.

28. The computer program product of claim 24 wherein non-uniformity is determined based upon distribution of data values in identified bucket ranges.

29. The computer program product of claim 24 wherein the histogram is deemed appropriate when the selected predicate comprises an equality predicate and the non-uniformity comprises non-uniformity in value repetition.

30. The computer program product of claim 29 wherein non-uniformity in value repetition exists when any value repeats as an endpoint in the histogram.

31. The computer program product of claim 24 wherein the histogram is deemed appropriate when the selected predicate comprises a like or range predicate and the non-uniformity comprises non-uniformity in range.

32. A computer program product that includes a computer-usable medium comprising a sequence of instructions which, when executed by a processor, causes said processor to execute a process for histogram determination in a database, the process comprising:

receiving a request to determine a histogram for a database column;

automatically determining whether a histogram is appropriate or inappropriate for the database column based upon whether the database column exhibits non-uniformity or uniformity, wherein no histogram is collected or saved if a histogram is deemed inappropriate for the database column; and collecting and saving the histogram if a histogram is deemed appropriate for the database column.

33. The computer program product of claim 32 wherein automatically determining whether the histogram is appropriate or inappropriate comprises determining whether the database column comprises range skew.

34. The computer program product of claim 32 wherein automatically determining whether the histogram is appropriate or inappropriate comprises determining whether an identified predicate has been asserted against the database column.

35. The computer program product of claim 32 wherein the process further comprises tracking predicate types for queries against the database column.

36. The computer program product of claim 32 wherein data sampling is performed to automatically determine whether the histogram is appropriate or inappropriate.

37. The computer program product of claim 32 wherein the histogram is deemed appropriate when an identified predicate against the database column comprises an equality predicate, the database column is non-uniform, and the non-uniformity in the database column comprises non-uniformity in value repetition.

38. The computer program product of claim 32 wherein the histogram is deemed appropriate when an identified predicate against the database column comprises a like or range predicate, the database column is non-uniform, and the non-uniformity in the database column comprises non-uniformity in range.

39. A system for histogram determination in a database, the system comprising:

means for tracking usage of a database column;

means for determining if a selected predicate is asserted against the database column;

means for determining if the database column exhibits non-uniformity by analyzing data distribution in the database column;

means for identifying the database column as appropriate for a histogram when the selected predicate is asserted against the database column and the database column exhibits non-uniformity; and means for identifying the database column as inappropriate for a histogram when the selected predicate is asserted against the database column and the database column exhibits uniformity, wherein no histogram is collected or saved if a histogram is deemed inappropriate for the database column.

40. The system of claim 39 wherein means for tracking usage of a database column comprises means for tracking predicate types for queries against the database column.

41. The system of claim 39 further comprising means for generating a histogram when the selected predicate is asserted against the database column and the database column is identified as appropriate for a histogram.

42. The system of claim 39 further comprising performing data sampling.

43. The system of claim 39 wherein non-uniformity is determined based upon distribution of data values in identified bucket ranges.

44. The system of claim 39 wherein the histogram is deemed appropriate when the selected predicate comprises an equality predicate and the non-uniformity comprises non-uniformity in value repetition.

45. The system of claim 44 wherein non-uniformity in value repetition exists when any value repeats as an endpoint in the histogram.

46. The system of claim 39 wherein the histogram is deemed appropriate when the selected predicate comprises a like or range predicate and the non-uniformity comprises non-uniformity in range.

47. A system for histogram determination in a database, the system comprising:

means for receiving a request to determine a histogram for a database column;

means for automatically determining whether a histogram is appropriate or inappropriate for the database column based upon whether the database column exhibits non-uniformity or uniformity, wherein no histogram is collected or saved if a histogram is deemed inappropriate for the database column; and means for collecting and saving the histogram if a histogram is deemed appropriate for the database column.

48. The system of claim 47 wherein means for automatically determining whether the histogram is appropriate or inappropriate comprises means for determining whether the database column comprises range skew.

49. The system of claim 47 wherein means for automatically determining whether the histogram is appropriate or inappropriate comprises means for determining whether an identified predicate has been asserted against the database column.

50. The system of claim 47 further comprising tracking predicate types for queries against the database column.

51. The system of claim 47 wherein data sampling is performed to automatically determine whether the histogram is appropriate or inappropriate.

52. The system of claim 47 wherein the histogram is deemed appropriate when an identified predicate against the database column comprises an equality predicate, the database column is non-uniform, and the non-uniformity in the database column comprises non-uniformity in value repetition.

53. The system of claim 47 wherein the histogram is deemed appropriate when an identified predicate against the database column comprises a like or range predicate, the database column is non-uniform, and the non-uniformity in the database column comprises non-uniformity in range.

* * * * *